United States Patent
Simonsen (10) Patent No.: US 6,676,720 B1
(45) Date of Patent: Jan. 13, 2004

(54) FILTER UNIT FOR FILTERING GAS (75) Inventor: Per Simonsen, Jyllinge (DK)

(73) Assignee: Niro A/S, Soeborg (DK)

( * ) Notice: Subject to any disclaimer, the term of this patent is extended or adjusted under 35 U.S.C. 154(b) by 397 days.

(21) Appl. No.: 09/700,419

(22) PCT Filed: Nov. 2, 2000

(86) PCT No.: PCT/DK00/00608

§ 371 (c)(1),
(2), (4) Date: Jul. 19, 2001

(87) PCT Pub. No.: WO01/51172

PCT Pub. Date: Jul. 19, 2001

(51) Int. Cl.$^7$ .............................................. B01D 46/04
(52) U.S. Cl. .............................. 55/302; 55/283; 55/301; 55/355; 95/273; 95/279; 95/280; 95/281
(58) Field of Search ..................... 55/283, 301, 302, 55/355; 95/273, 279, 280, 281

(56) References Cited

U.S. PATENT DOCUMENTS

| | | | |
|---|---|---|---|
| 1,981,356 A | 11/1934 | Hartch | |
| 2,932,362 A | 4/1960 | Roper | |
| 3,041,808 A | 7/1962 | Snyder | |
| 3,816,979 A | * 6/1974 | Waves | 55/302 |
| 4,058,379 A | * 11/1977 | Cheng | 55/302 |
| 4,645,520 A | 2/1987 | Huttlin | |
| 4,726,820 A | * 2/1988 | Stanelle | 55/302 |
| 4,731,100 A | 3/1988 | Loeffelmann et al. | |
| 4,735,635 A | * 4/1988 | Israelson et al. | 55/302 |
| 5,017,200 A | * 5/1991 | Price et al. | 55/302 |
| 5,444,892 A | 8/1995 | Ris et al. | |
| 5,795,359 A | 8/1998 | McLeish et al. | |
| 6,149,716 A | 11/2000 | Bach et al. | |

FOREIGN PATENT DOCUMENTS

| | | |
|---|---|---|
| EP | 0 719 577 A2 | 11/1995 |
| WO | WO 98/00001 | 1/1998 |
| WO | WO 01/03808 A1 | 1/2001 |

* cited by examiner

Primary Examiner—Blaine Copenheaver
Assistant Examiner—Minh-Chau T. Pham
(74) Attorney, Agent, or Firm—Sughrue Mion, PLLC (57) ABSTRACT

A filter unit (1) for filtering gas has a plurality of bag filters (10) hanging down from a suspension plate (7) dividing a housing into a lower gas inlet side (9) and an upper outlet side (8) for filtered gas. The individual bag filter (10) has an open end (11) at the suspension plate, a tubular wall (20) of a flexible filter material, and a lower end closure (23) of an impermeable material and provided with a drain (25). The end closures of the bag filters are interconnected.

20 Claims, 6 Drawing Sheets

FILTER UNIT FOR FILTERING GAS

BACKGROUND OF THE INVENTION

1. Field of the Invention

The present invention relates to a filter unit for filtering gas and having a plurality of bag filters hanging down from a suspension plate dividing a housing into a lower gas inlet side and an upper outlet side for filtered gas, and a plurality of cleaning nozzle devices arranged on the outlet side of the bag filters, in which the individual bag filter has at least an open end at the suspension plate, a tubular wall of a flexible filter material, and a lower end.

2. Description of Related Art

A filter unit of this kind is known from WO 98/00001 (Niro). Such bag filters are only rigidly fixed at one end at the suspension plate, and the flexible filter material is closed into an end bottom at the opposite, lower end. The bag filters typically have a length of at least several meters, and a reverse jet cleaning nozzle device ejects pulses of cleaning air down through the open upper end of the bag filter at regular intervals during the filtration process in order to clean deposited product off the outside of the filter bag. The pressure of the pulse of cleaning air needs to be relatively high in order for the pulse to penetrate down to the lower portion of the bag filter and subject the filter material in that area to an adequate pressure increase to knock loose the deposited product. The pressure is in particular required to be relatively high when the bag filter has a relatively long length.

In between periods of operation the filter unit throughout is cleaned, e.g. by a cleaning-in-place process (CIP) involving cleaning nozzles located at least in the clean gas chamber at the upper outlet side of the bag filters. The cleaning nozzles are supplied with a cleaning liquid that possibly includes a cleaning agent. It is also possible to supply the cleaning nozzles with gas pulses in combination with the supply of cleaning liquid. During cleaning the cleaning liquid is washed down into the bag filters together with any entrained particles or powder from the clean gas side.

The liquid flows through the bag filters, but particles or powders can accumulate at the bottom of the bag filters, resulting in a somewhat imperfect cleaning of the filter unit.

The pressures from the pulses ejected during filtration or in between periods of operation act on the flexible filter material and will during time cause mechanical wear which can result in local areas with too high a porosity. Cleaning agents used in the cleaning liquid can weaken the filter material and make it more vulnerable to machanical influences. Formation of small holes in the lower end portion of the bag filter may occur, which shortens life span of the bag filters.

SUMMARY OF THE INVENTION

An object of the present invention is to improve the cleanliness of a freshly cleaned filter unit and also the life span of the bag filters.

In view of this the filter unit according to the present invention is characterized in that the lower end of the individual bag filter is an end closure of an impermeable material and provided with a drain, that said tubular wall has a downwards open end fixed to the end closure, and that the end closures of the bag filters are interconnected.

The impermeable end closure is durable, non-filtering and has a drain through which cleaning liquid and any particles or other remains from the cleaning process can be flushed out. The cleaned and drained bag filters have no remains or deposits of particles or dust on their inside, and a CIP process results in a completely sanitary filter unit.

A further advantage of the present invention is a reduction of the drying time required from finished cleaning to initiation of normal filtering operation. The cleaned bag filters contain only small amounts of cleaning liquid due to the draining, and also due to the impermeable end closure material which cannot draw in liquid.

The pressure pulse, whether ejected during filtration or in between filtration processes, loads the filter material with hoop stresses, but the vertically directed tensile stresses, which in the prior art bag filters are caused by the pressure pulse hitting the end bottom, have been avoided or at least effectively diminished by making the tubular wall of flexible filter material with an open end. The pressure pulse hits the end closure and due to the interconnections between the end closures the downwards directed force from the pressure pulse is distributed to the neighbouring end closures or to the housing through a support structure. The result is a lower loading on the filter wall material for a given pulse pressure.

The interconnection of the end closures also lock their mutual positions in the horizontal direction, and this prevents the tendency to formation of small holes in the lower section of the bag filters. In the prior art filter units it is presumed that sideways movement of individual or a group of bag filters with respect to the remaining bag filters could happen due to the flow of incoming gas into the filter unit with the consequences that a bag filter would rub against or hit a neighbouring bag filter. Also, sideways movement of individual bag filters could sometimes be caused by the pressure pulses hitting the end bottom. The interconnections prevent such horizontal movements of the bag filters. The lower internal loading on the filter wall material and the avoidance of external local loading from contact with other bag filters are both factors leading to a longer life span of the bag filters.

An additional advantage of the present invention resides in the possibility for mounting the bag filters in a more close or dense configuration, and/or to use bag filters of longer length.

Preferably, the end closures of the bag filters are substantially stationary mounted in the filter housing. This provides a mechanically simple structure that facilitates cleaning of the space below the suspension plate. The stationary mounting is also an advantage when the lower ends of the tubular walls of flexible material have to be fixed to the associated end closures. As an alternative to the stationary mounting, the end closures can be mounted with a possibiliy for limited adjustment of their position in the vertical direction, such as by interposing a hydraulic cylinder between the interconnected end closures and the filter housing. In this manner the end closures can be precisely positioned in accordance to the current actual length of the tubular walls of the bag filters, because the upper ends of the bag filters remain stationary fixed at the suspension plate. Another possibility for adapting to the current length of the bag filters is to use stationary end closures and spring loaded or flexible tubular wall end portions interposed between the end closures and the lower end portions of the bag filters.

In an embodiment that is well suited for large filter units having many bag filters, each end closure is fixed onto a drain pipe, and the drain pipes with end closures are arranged in at least one row on a transversely extending, rigid collecting pipe connected to and supporting the drain pipes with end closures in said row. The drains in this row can be commonly controlled by a valve in the collecting pipe. For sanitary reasons it is an advantage to use a collecting pipe, because the drain exit from the individual end closure is shielded by the collecting pipe from the dusty gas inlet chamber.

For further improvement of sanitary conditions and facilitated cleaning the individual collecting pipe preferably has a diamond-like cross-sectional shape with the longer axis extending upwards. The collecting pipe has an upwards facing surface which is exposed to product settling. By making the collecting pipe with an oval or more regular diamond-like shape, the upwards facing, almost horizontal portion of the pipe becomes smaller and the side faces obtains a steeper slope which counteracts product deposits on top of the pipe.

Preferably, the sanitary conditions are improved by letting the individual collecting pipe extend out of the housing of the filter unit so that the pipe has no free opening to the gas inlet chamber at the lower side of the suspension plate. With this design the collecting pipe(s) and the drains in the end closures are only open to the clean gas side and have only to carry cleaning liquid and possible product remains washed away from the inside of the bag filters. A further advantage is that valves, connections etc. associated with the collecting pipes can be located outside the filter housing which reduces the number and size of upwards facing surfaces located inside the filter housing.

A further sanitary improvement can be obtained by making both ends of the individual collecting pipe extend out of the housing, and that the non-draining end of the collecting pipe is connected via a valve to a source of cleaning liquid or drying gas. This allows the collecting pipes to be cleaned by flushing with cleaning liquid and thus become independent of the amount of cleaning liquid flowing down through the bag filters.

In an embodiment the individual bag filter is designed so that a filter basket providing radial support to the tubular wall of the bag filter in a well-known manner, is supported by the end closure. By supporting the filter basket the end closure also reduces mutual movements between the basket and the end closure and the tubular wall fixed thereto. In addition the suspension plate is relieved from some of its load.

In an embodiment that is preferred due to its ability for being relatively quickly and completely cleaned during a CIP-process the flexible filter material is, in between end portions, a non-folded cloth or felt, and in each end portion the filter material is provided with a ringshaped stiffener. At the top and the bottom ends the stiffener is during mounting of the tubular wall of the filter bag snap locked into engagement with the suspension plate and the end closure, respectively.

It is an advantage to design the top and bottom ends of the tubular wall of the bag filter so that they are identical. When mounting such a bag filter in the filter unit it does not matter which end is turned upwards and so mounting is facilitated.

In a further development the cloth is of a synthetic material and includes a coating of PTFE. The PTFE coating provides the filter material with a diminutive mesh size, but due to the drainage at the end closure it is nevertheless with the present invention possible to obtain fully sanitary conditions during cleaning of the bag filter. This allows for production of very fine powders by use of a bag filter having an economical design.

In a very simple and durable embodiment the end closure is a metal cup with a central drain hole and an inwards protruding upper rim area. A snap lock ring in the lower end of the tubular wall can easily be mounted behind the inwards protruding rim.

The decoupling of the pulse pressures from the longitudinal tensile stress loading of the filter material allows an increase of the pulse pressures without overloading the filtering material. According to the present invention it is possible to make the individual bag filter with a length of at least 8.5 m. Sufficient cleaning of the long bag filter can be obtained by raising the pulse pressure.

BRIEF DESCRIPTION OF THE DRAWINGS

Examples of the invention will in the following be described in further detail with reference to the accompanying very schematic drawings, in which.

DETAILED DESCRIPTION OF THE INVENTION

Figure 1:
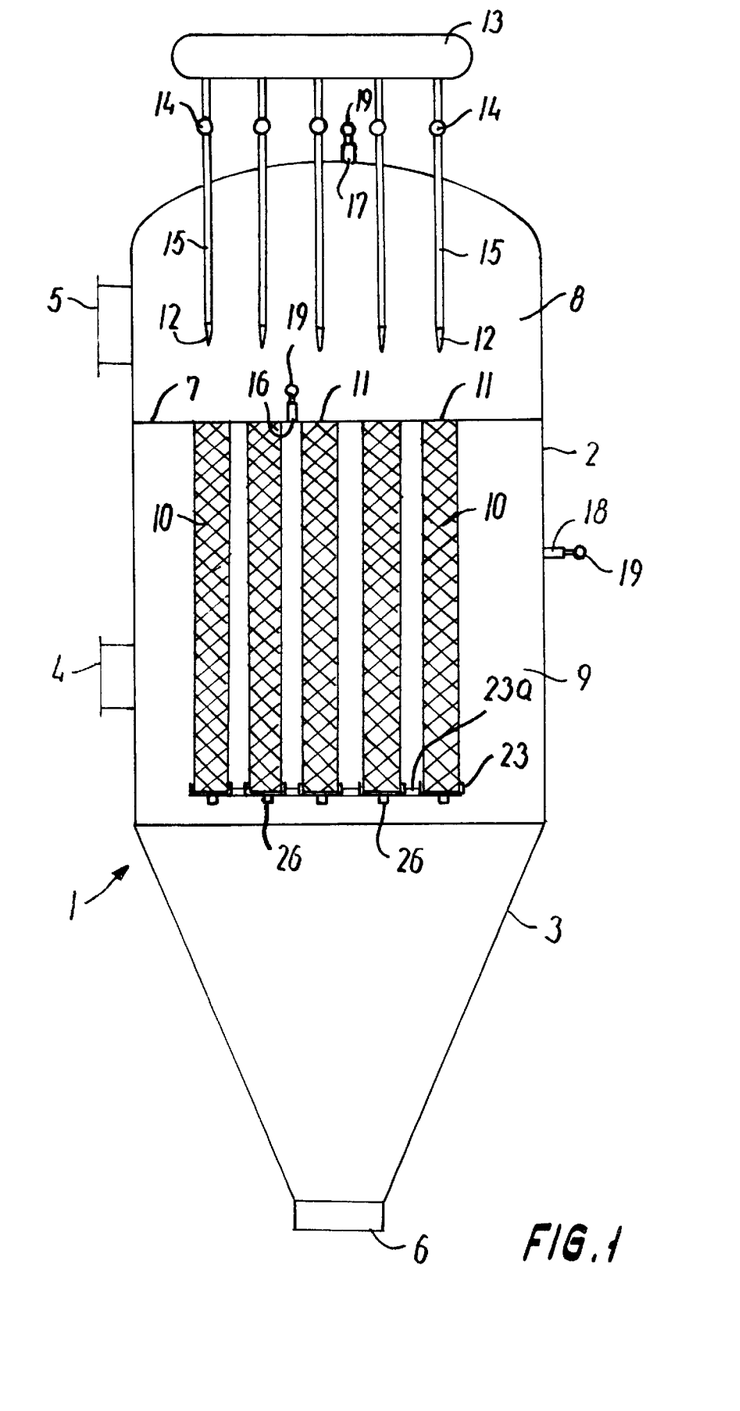
FIG. 1 depicts a sectional view of a filter unit according to the invention.

FIG. 1 illustrates a filter unit 1 employed for separating product particles from a process gas coming e.g. from a spray drying apparatus, a fluid bed apparatus, a drying apparatus, an agglomeration apparatus or the like using air or a gas in the treatment of particulate or dustlike products, or from other industrial processes, such as flue gas cleaning. The products can be e.g. foodstuffs, dairies, pharmaceuticals, dyestuffs, chemical products etc. The process gas can be e.g. heated air or drying gas or special gas compositions inert to the products treated in the apparatus.

A filter unit housing is composed of a vertically arranged cylindrical upper section 2 connected with a downward tapered lower section 3. An inlet 4 for process gas with product to be filtered off is arranged in the lower part of the cylindrical section 2 and an outlet 5 for filtered clean gas is arranged in the upper part of section 2. At the bottom of the lower section 3, an outlet port 6 is arranged for extraction of retained product.

A horizontal suspension plate 7 is arranged in the upper part of the cylindrical section 2 and divides the housing in an upper outlet side with a clean-gas chamber 8 and a lower inlet side 9. The plate 7 has a number of holes, in which elongated tubular bag filters 10 are suspended approximately vertically with upwards open ends 11 which delivers filtered gas to the clean-gas chamber 8. The tubular wall of the bag filters 10 is made of soft, flexible filter wall material, such as a polymeric mesh or weave or a felt of natural or syntetic fibres or yarns. Preferred materials are polymers, e.g. polyesters or polypropylene.

The number of bag filters in the filter unit depends on the desired filter capacity. The smallest filter has a single filter element. Plants for treating, handling or producing pharmaceuticals can use smaller filter units having e.g. from 2 to 25 bag filters, and plants for foodstuffs, dairies and chemicals can comprise very large filter units with many hundreds of bag filters in a single filter unit.

During operation of the filter unit 1 process gas carrying product enters the unit through inlet 4 and flows into the area around the bag filters. The gas is filtrated through the tubular walls of the bag filters 10 and flows out through outlet 5. As the gas passes the filter walls product carried by the process gas is retained by the bag filters 10. The retained material is partially left on the bag filters and partially drops down and accumulates in the lower section 3. The accumulated product can then be extracted through the outlet port 6.

During filtration a flow of filtrated gas streams vertically up into clean-gas chamber 8. As the filtration proceeds some of the filtered off particles or dust accumulate on the outside of the filter element, and has to be cleaned away in order to avoid building up of dust cakes. Cleaning is effected during continuous operation of the filter unit by using high pressure reverse pulse gas cleaning.

A cleaning nozzle 12 positioned above the open end 11 can eject a burst of reverse-flowing cleaning gas down into the bag filter at intervals adapted to the current filtration process. The pulse of cleaning gas produces a very quick pressure increase inside the bag filter so that the filter wall accelerates outwards and deposits are shaken off.

A pressure vessel 13 contains pressurized cleaning gas, and the admission thereof to the cleaning nozzle is controlled by a valve 14 in connection pipe 15 allowing the bag filters to be cleaned individually during operation. Control valves 14 can be operated i any known manner.

When a filtration procedure is completed and the filter unit needs cleaning, for sanitary reasons or because it is to be used for filtration of another product, a cleaning-in-place (CIP) process is carried out during which the complete interior of the filter unit is washed with a cleaning liquid.

Cleaning or washing nozzles 16 are mounted in the suspension plate 7. For the sake of simplicity only a single nozzle is indicated on the drawing, but actually there are many nozzles, preferably evenly distributed in between the holes for the bag filters 10. When in the open condition washing nozzles 16 are adapted to radially direct a flow of cleaning liquid along the lower side of the plate 7 and towards the bag filters. When not in use, the nozzles are held in a closed position by means of a return spring.

Cleaning or washing nozzles 17 are also mounted in the ceiling of clean-gas chamber 8. Also in this case only a single nozzle is depicted, but actually a plurality of nozzles are distributed over the ceiling so that all surfaces within the chamber is washed during a cleaning operation.

Cleaning or washing nozzles 18 are also mounted in the cylindrical section 2 of the housing in a number and with a distribution ensuring cleaning of all surfaces within the housing.

The cleaning and washing nozzles can be of similar type, such as a retractable CIP nozzle of the make Niro A/S, Soeborg, Denmark or any other cleaning nozzle for use in a filter unit, or the cleaning and washing nozzles can be of different types such as non-retractable nozzles in the suspension plate, rotating retractable nozzles in the cylindrical housing, and stationary nozzles in the ceiling of the clean-gas chamber. Cleaning liquid, such as water, a cleaning agent or water with a cleaning agent, is supplied to the nozzles via supply pipes 19 that are provided with control valves for opening and closing for the supply of cleaning liquid.

Figure 2:
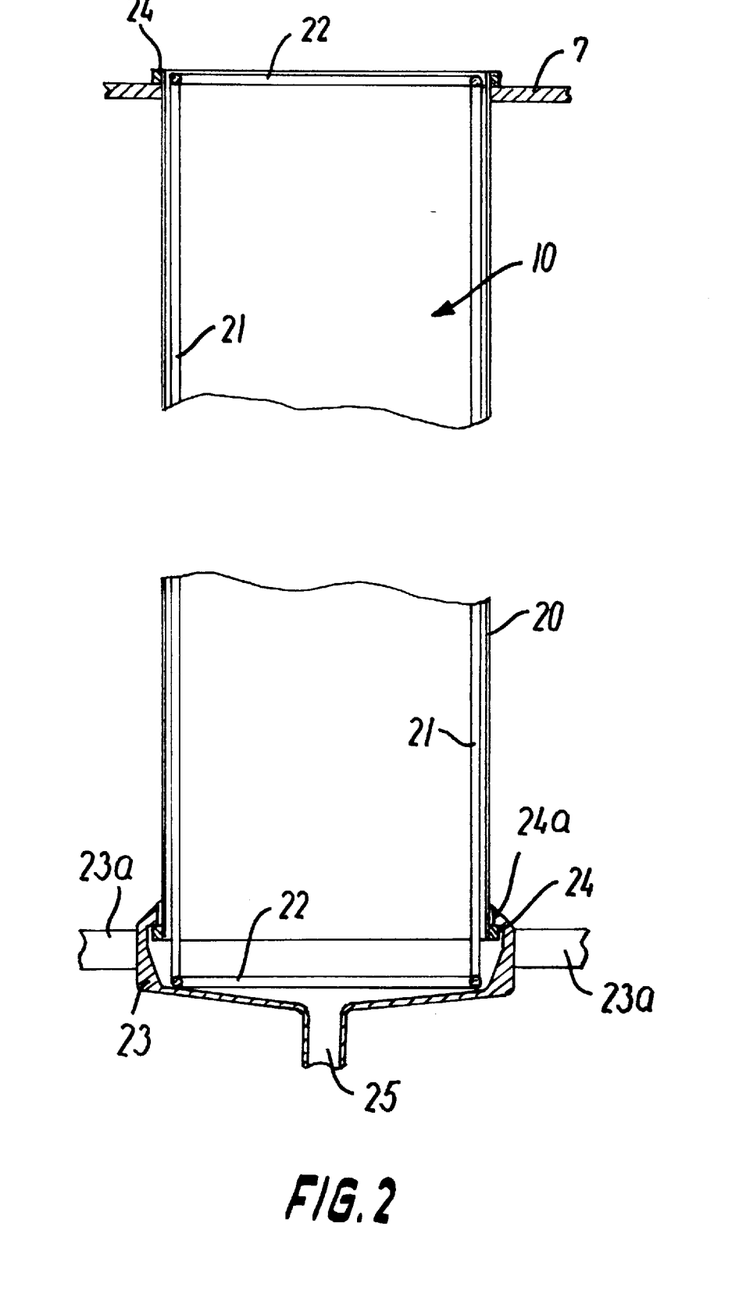
FIG. 2 is a sectional view of a bag filter of the filter unit in FIG. 1.

The tubular bag filter 10 shown in the FIG. 2 comprises a non-folded single-layered or multi-layered soft filter material 20 supported radially on its inside by means of a filter basket 21 made of threads extending in the longitudinal direction of the bag filter and being attached to rings 22 of thread. Such thread baskets are well-known in the art and comprise at least three longitudinal threads and at least two rings, but typically more than five threads and typically at least four rings per meter of length of the bag filter.

The bag filter has at its lower end an end closure 23 of an impermeable, rigid and strong material, such as steel, stainless steel or another metal, polymers or ceramics. The basket is standing on the inner bottom of the end closure supported by the latter. The filter basket can be made in several sections mounted in extention of each other. As an alternative to being supported by the end closure, or in addition thereto, the top end of the basket can be suspended in the hole in suspension plate 7 by means of an upper ring collar of a larger diameter than the hole and being placed on the upper side of plate 7.

The bag filter has at the upper end and at the lower end a ringshaped stiffener 24 of larger diameter than the intermediary tubelike wall of filter material. At mounting of the filter material the lower end stiffener is flexed and snapped into engagement below an inwards projecting shoulder 24a at an upper rim area of end closure 23. The upper end stiffener is placed on the upper surface of suspension plate 7. The basket is lowered down into the bag filter after mounting of the tubular wall. Other means of detachably locking the tubular wall onto the suspension plate and the end closure, respectively are available, such as using a manacle rings, bayonet joints or another locking mechanism.

The end closures 23 are interconnected to be mutually stationary. The interconnections can be rigid stiffener members 23a welded onto the outside of end closures 23. The stiffener member or web can be of any configuration capable of keeping the distance between the end closures, such as a piece of plate or pipe or a profiled member. The end closures can also be mounted onto a supporting beam structure. The interconnected end closures can in one embodiment be hanging in the tubular walls of the bag filters, but embodiments providing support to the filter housing are preferred. Such support can fix the end closures in stationary connection to the housing, or it can be of an adjustable type allowing heigth adjustment of the positioning of the end closures in the housing. As examples of the latter type can be mentioned one or more hydraulic cylinders having one end fixed to the housing and the other end fixed to the end closure structure, or leaf springs interposed between the housing and the end closures. The heigth adjustment allows the end closures to be compliantly positioned in accordance with the current length of the tubular walls of the bag filters.

In the above embodiments, the downwards open end of the tubular wall is releasably fixed to the end closure. In another embodiment the end closure is integrated with the tubular wall and is disposable together with it. This end closure can e.g. be injection moulded and can include sideways protruding snap lock members for interconnection with mating snap lock members on the neighbouring end closures.

Figure 3:
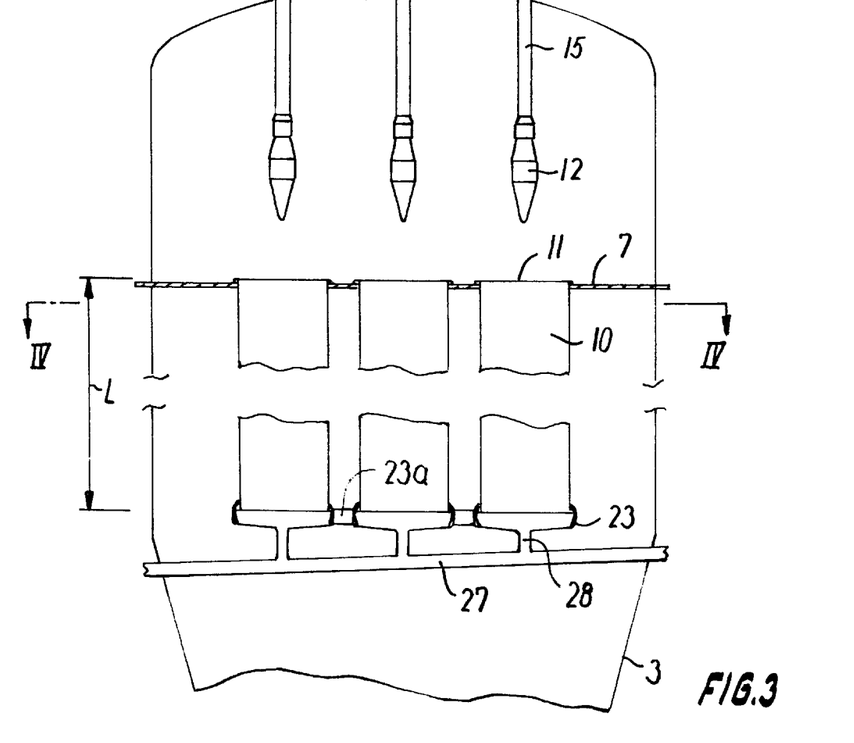
FIG. 3 is a sectional partial view of another emdodiment of the filter unit.
Figure 4:
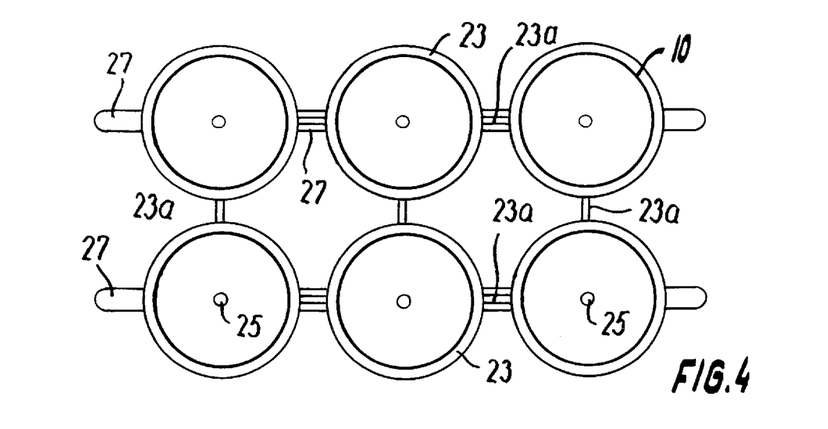
FIG. 4 is an enlarged sectional view along IV—IV in FIG. 3.

Each end closure has a drain 25 which can be individually provided with non-return valves 26 as depicted in FIG. 1, or the drain can be connected to a collecting pipe 27 via a drain pipe 28 as depicted in FIG. 3. The collecting pipe includes at least one control valve 29 (FIG. 5) which can open or close for the connection to a discharge, such as a tank or a drainage 30.

Figure 5:
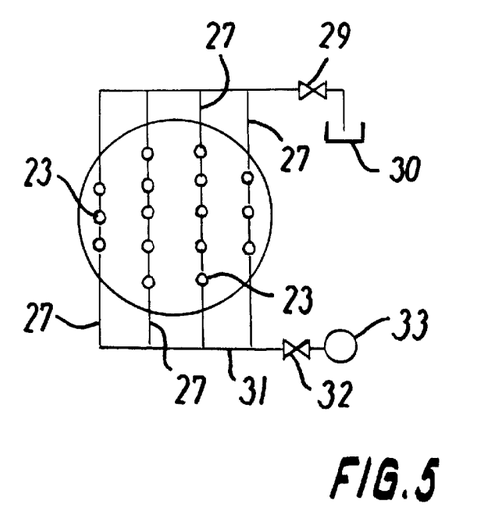
FIG. 5 illustrates an arrangement of cleaning and collecting pipes in a filter unit.

The collecting pipe or pipes can terminate within the filter housing and simply discharge cleaning liquid down into the tapered lower section 3, but the collecting pipe or pipes 27 preferably extend out of the housing (FIG. 5). It brings several advantages to let the collecting pipes extend out of the housing. Firstly, there are fewer filter components within the housing, because valves with associated control elements can be positioned outside the housing. Secondly the wall of the filter housing will support the collecting pipes which on their side support the end closures 23 so that a separate mounting structure in the housing can be dispensed with. The collecting pipes also interconnect the end closures so that use of additional stiffeners 23a possibly also can be dispensed with. A third advantage resides in the possibility to connect the collecting pipes to a supply pipe 31 which via a control valve 32 can apply an agent from a source 33, such as a cleaning liquid or drying gas. Cleaning liquid from source 33 can be used to flush the drain system, and drying gas can be supplied to assist in drying the lower portions of the bag filters after a completed cleaning process.

Figure 6:
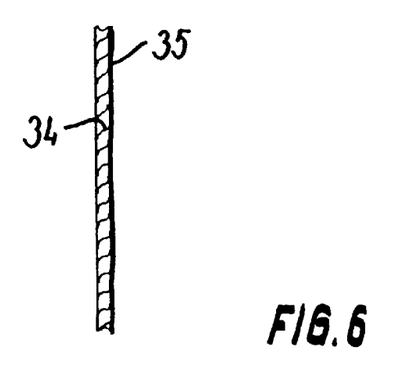
FIG. 6 depicts a part-sectional view of an embodiment of filter material in a bag filter.

The tubular wall of the bag filters are preferably of an unfolded material 34, and in case the bag filter is to be used for filtration of very fine dustlike products, the material can carry a coating 35 providing a fine pore or mesh size, such as a coating of PTFE.

Figure 7:
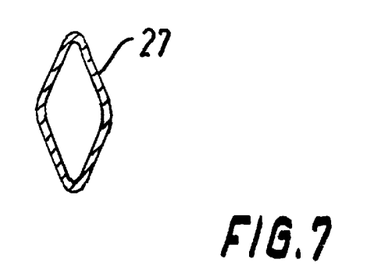
FIG. 7 is a cross-sectional view of collecting tube having diamond-like shape.

The collecting pipe can be embodied with a non-circular cross-sectional shape, such as a diamond-like shape as depicted in FIG. 7. This pipe exhibits only a relatively small opwards facing area in relation to its size, and it furthermore provides a more rigid support for the end closures.

The end closures can as mentioned above be mounted in rows on collecting pipes. The rows are rectilinear in the embodiment of FIG. 5, but other row configuration are also possible, such as circular or polygonal configurations and can be used e.g. when integrating bag filters in processing units as described below.

The bag filters are stationary during the cleaning-in-place operation.

The above mentioned filter unit is a separate external unit connected to a gas outlet for particle loaded processing gas in a plant. Alternatively, the filter unit can be integrated into a processing unit producing the particle loaded gas, such as a spray drying apparatus or a fluid bed apparatus. Examples of such integrated filter dryers are generally outlined in the patent application DK 1999 01394 (Niro).

Figure 8:
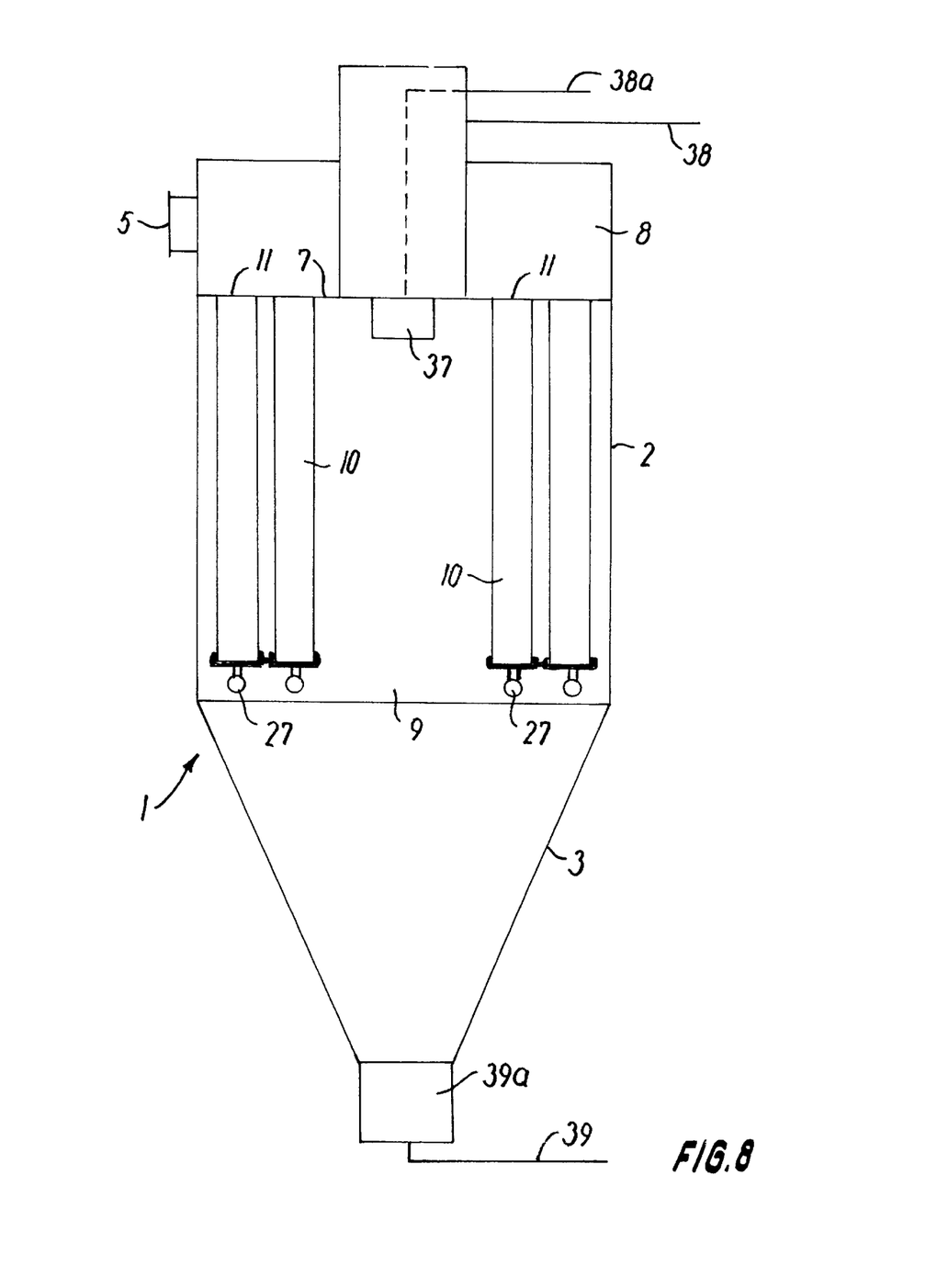
FIGS. 8 and 9 illustrate embodiments where the filter unit is integrated in a spray dryer and a fluid bed, respectively.

In FIG. 8 is illustrated a spray dryer with an integrated filter unit using bag filters. The unit includes cleaning nozzles and washing nozzles as described above, but for the sake of simplicity these details are not shown in FIG. 8. A gas disperser 36 is arranged centrally over suspension plate 7 with an atomizing wheel or nozzles 37 located below plate 7. A supply line 38 for drying gas is connected to the gas disperser, and a feed line 38a for product is leading to the atomizing wheel or nozzles. A secondary drying gas feed line 39 is connected to an integrated fluid bed 39a in the conical portion 3. In an alternative embodiment (not shown) the integrated fluid bed is omitted. The bag filters 10 are arranged in groups around the atomizing device. The drying gas exits the processing chamber through the bag filters 10 and outlet 5 and filtered off product is removed from the lower end of the processing chamber.

Figure 9:
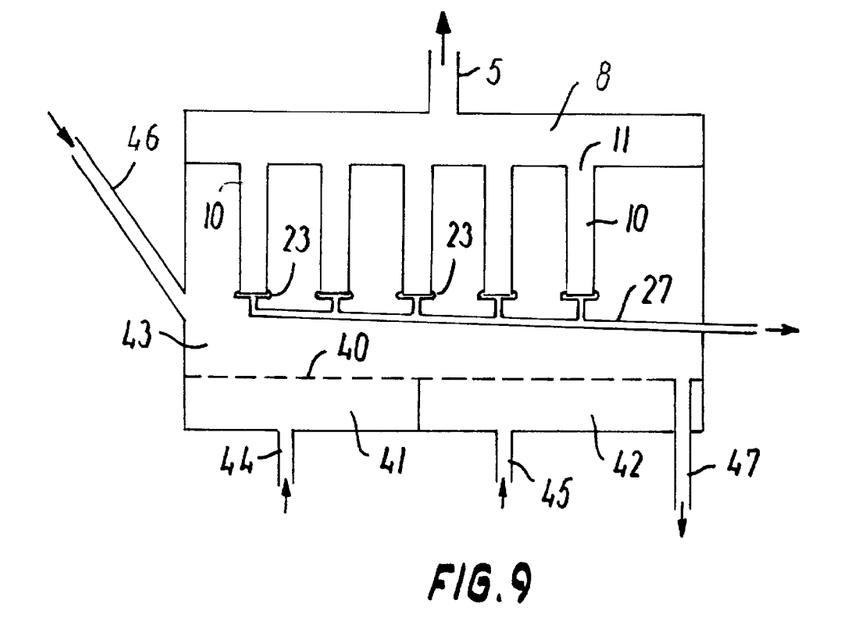

In FIG. 9 is illustrated a fluid bed with an integrated filter unit using bag filters. The unit includes cleaning nozzles and washing nozzles as described above, but for the sake of simplicity these details are not shown in FIG. 9. A perforated plate 40 in the lower portion of the unit separates gas plenum chambers 41, 42 from a drying chamber 43 and drying gasses are supplied into the gas plenum via gas inlets 44, 45. Product to be dryed is introduced via product supply line 46, and dried product is removed via product outlet line 47.

Figure 10:
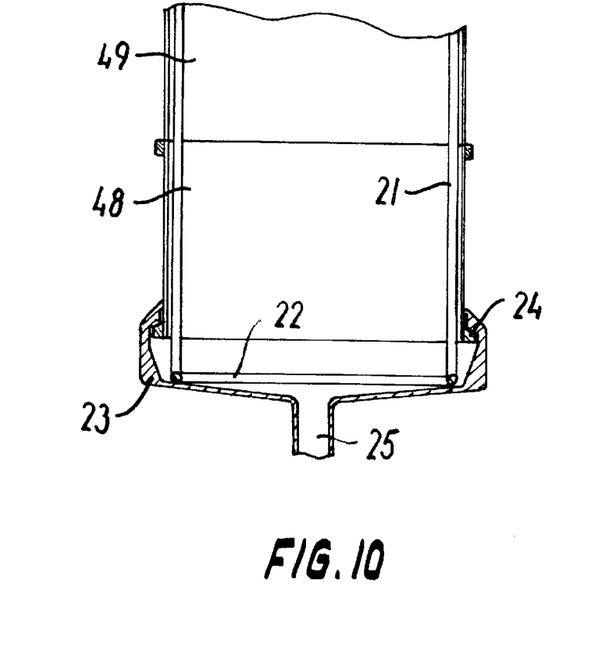
FIG. 10 is a sectional view of a lower portion of a further embodiment of a bag filter.

In a further embodiment illustrated in FIG. 10 the bag filter includes a resilient portion 48 inserted between the end closure 23 and the remaining portion 49 of the tubular wall. The resilient portion pulls in portion 49 with a predetermined axially directed spring force so that the tubular wall is longitudinally tensioned when the bag filter is in mounted state. Resilient portion 23 is tubular and can be of any elastic material. The resilient portion compensates for the changes in length of portion 49 due to temperature changes etc.

Details of the various embodiments described above can be combined into further embodiments.

What is claimed is:

1. A filter unit for filtering gas, wherein the filter unit has a housing with a suspension plate dividing the housing into a lower gas inlet side and an upper outlet side for filtered gas, a plurality of bag filters hanging down from said suspension plate, and a plurality of cleaning nozzle devices arranged on the upper outlet side of the bag filters, wherein the individual bag filter has at least an open end at the suspension plate, a tubular wall of a flexible filter material, and a lower end, which lower end of the individual bag filter is an end closure of an impermeable material and provided with a drain, which tubular wall has a downwards open end fixed to the end closure, and wherein the end closures of the bag filters are interconnected.

2. A filter unit according to claim 1, wherein the end closures of the bag filters are substantially stationary mounted in the filter housing.

3. A filter unit according to claim 1, wherein each end closure is fixed onto a drain pipe, and that the drain pipes with end closures are arranged in at least one row of a transversely extending, rigid collecting pipe connected to and supporting the drain pipes with end closures in said row.

4. A filter unit according to claim 3, wherein the individual collecting pipe has a diamond cross-sectional shape with a longer axis extending upwards and a shorter axis extending sidewards.

5. A filter unit according to claim 3, wherein the individual collecting pipe extends out of the housing of the filter unit.

6. A filter unit according to claim 3, wherein both ends of the individual collecting pipe extend out of the housing, and that a non-draining end of the collecting pipe is connected via a valve to a source of cleaning liquid or drying gas.

7. A filter unit according to claim 1, wherein a filter basket providing radial support to the tubular wall is supported by the end closure.

8. A filter unit according to claim 1, wherein the tubular wall has two end portions and in between said end portions the flexible filter material is a non-folded layer cloth or felt, and in each end portion the filter material is provided with a ringshaped stiffener.

9. A filter unit according to claim 8, said cloth or felt is of a synthetic material and includes a coating of PTFE.

10. A filter unit according to claim 1, wherein the the tubular wall includes a top end and a bottom end, which top end and bottom end are identically designed.

11. A filter unit according to claim 1, wherein the end closure is a metal cup with a central drain hole and an inwards protruding upper rim area.

12. A filter unit according to claim 1, wherein the individual bag filter has a length of at least 8.5 m.

13. A filter unit according to claim 1, wherein the bag filter includes a resilient portion providing longitudinal tension in the tubular wall when the bag filter is mounted to the suspension plate and the end closure, respectively.

14. A filter unit according to claim 1, wherein the downwards open end of the tubular wall is releasably fixed to the end closure.

15. A filter unit according to claim 1, wherein the filter unit is integrated in a processing unit, such as a spray drying apparatus or a fluid bed apparatus.

16. A filter unit for filtering gas, wherein the filter unit has a housing with a suspension plate dividing the housing into a lower gas inlet side and an upper outlet side for filtered gas, a plurality of bag filters hanging down from said suspension plate, and a plurality of cleaning nozzle devices arranged in the housing, wherein the individual bag filter has an open end at the suspension plate, a tubular wall of filter material, and a lower end, which lower end is an end closure provided with a drain with a drain pipe, and wherein the drain pipes with end closures are arranged on and connected to at least one transversely extending rigid collecting pipe.

17. A filter unit according to claim 16, wherein the individual collecting pipe extends out of the housing of the filter unit.

18. A filter unit according to claim 17, wherein a non-draining end of the collecting pipe is connected via a valve to a source of cleaning liquid or drying gas.

19. A filter unit according to claim 16, wherein a downwards open end of the tubular wall is releasably fixed to the end closure.

20. A filter unit for filtering gas, wherein the filter unit has a housing with a suspension plate dividing the housing into a lower gas inlet side and an upper outlet side for filtered gas, a plurality of bag filters hanging down from said suspension plate, and a plurality of cleaning nozzle devices arranged in the housing, wherein the individual bag filter has an open end at the suspension plate, a tubular wall of filter material, and a lower end, which lower end is a metal cup with a central drain hole which via a drain pipe is connected to a transversely extending rigid collecting pipe that extends out of the housing of the filter unit.

* * * * *